United States Patent
Cook et al.

[11] 3,917,383
[45] Nov. 4, 1975

[54] OPTICAL WAVEGUIDE BUNDLE CONNECTOR

[75] Inventors: Thomas A. Cook; Marshall C. Hudson, both of Corning; Jerome G. Racki, Painted Post, all of N.Y.

[73] Assignee: Corning Glass Works, Corning, N.Y.

[22] Filed: Mar. 29, 1974

[21] Appl. No.: 456,185

[52] U.S. Cl. ............................ 350/96 C; 350/96 B
[51] Int. Cl.² .......................................... G02B 5/16
[58] Field of Search ..................... 350/96 C, 96 B

[56] References Cited
UNITED STATES PATENTS

| | | | |
|---|---|---|---|
| 3,798,099 | 3/1974 | Marcatili | 350/96 C X |
| 3,846,010 | 11/1974 | Love et al. | 350/96 C X |

OTHER PUBLICATIONS
Bloem et al., "Fiber-Optic Coupler" IBM Technical Disclosure Bulletin Vol. 16 No. 1, June 1973. pp. 146 & 147 cited.

*Primary Examiner*—David H. Rubin
*Attorney, Agent, or Firm*—William J. Simmons, Jr.; Walter S. Zebrowski; Clarence R. Patty, Jr.

[57] ABSTRACT

An in-line connector for joining first and second bundles of optical waveguide fibers. The end portions of the fibers of the first and second bundles are respectively disposed in one or more line arrays on complementary formed fiber supporting surfaces, an end fiber in each array being in contact with fiber positioning means which is disposed at one end of the associated fiber supporting surface. The first and second fiber supporting surfaces and their respective array positioning means are aligned so that the array of fibers formed from the first bundle is substantially aligned with the array of fibers from the second bundle.

12 Claims, 6 Drawing Figures

OPTICAL WAVEGUIDE BUNDLE CONNECTOR

BACKGROUND OF THE INVENTION

Optical waveguides, which are a promising transmission medium for optical communication systems, normally consist of an optical fiber having a core of transparent material having a refractive index $n_1$ surrounded by a layer of transparent cladding material having a refractive index $n_2$ that is lower than $n_1$. Although the theory of optical waveguides has been known for some time, practical optical waveguides that do not absorb an excessive amount of transmitted light have been developed only recently. For example, U.S. Patent No. 3,659,915 issued to R. D. Maurer et al. discloses a low loss optical waveguide comprising a sladding layer of fused silica and a core of fused silica doped with one or more materials that selectively increase the index of refraction of the core above that of the cladding. Other optical waveguide structures include multiclad fibers and fibers having a gradient refractive index.

To effectively utilize low loss optical waveguide bundles for communication purposes, means is required for coupling light from one bundle to another with little loss of signal, i.e., with low insertion loss. When two optical waveguides are joined end-to-end, insertion loss can result from center-to-center mismatch, angular misalignment of the fiber axes, fiber-to-fiber separation, rough end finish and Fresnel reflections. Two waveguides can be coupled with a minimum of insertion loss by employing well known techniques. This discussion of insertion loss is based on the end-to-end coupling of two fused silica optical waveguides of the type disclosed in the aforementioned U.S. Pat. No. 3,659,915 having a diameter of 5 mils and a cladding thickness of 1 mil. If misregistration of the centers of the two fibers is the only loss mechanism, a loss of about one dB occurs if the centers thereof are separated by 0.5 mil. For reasonably low insertion losses to be achieved, the fibers must therefore be registered within 0.5 mil. Due to the relatively low numerical aperture of optical waveguides, attention must be given to the axial alignment of the two fibers. The fiber axes must be substantially aligned, i.e., they must be aligned to within 3° to keep insertion losses less than about one dB, assuming that no other loss mechanisms are operative. A rough surface finish at the end of a fiber causes random refraction and scattering. Polishing and finishing in accordance with well known glass finishing techniques minimizes this type of loss. Since light diverges from the fiber axis as it radiates from a fiber, some light is lost if the two fibers are separated; therefore, the ends of the fibers should be maintained in virtual contact. Fiber-to-fiber separation also implies an insertion loss due to Fresnel reflections at the two glass-air interfaces. For the aforementioned fused silica optical waveguides, this amounts to 0.15 dB per interface. This loss can be eliminated by disposing between the fiber ends a layer of index matching material such as an oil or other fluid having a refractive index of about 1.5.

When bundles of optical waveguide fibers are to be coupled, most of the aforementioned insertion losses can be minimized in the manner described in conjunction with the fiber-to-fiber coupling. That is, to minimize losses between two coupled fiber bundles, the axes of all fibers in both bundles should be substantially parallel, the ends of the fibers in one bundle should be virtually touching the ends of the fibers in the other bundle, the ends of all fibers should be polished, and index matching fluid should be disposed between the ends of the fibers in the two bundles. Finally, the end of a fiber in one bundle should be substantially centered with respect to a corresponding fiber in the other bundle. The present invention is directed toward this latter requirement.

Proper center-to-center alignment of corresponding fibers in two coupled bundles is probably the most difficult condition to fulfill in the reduction of insertion loss. This type of insertion loss is referred to as "packing fraction" loss since it is related to the packing fraction of the waveguide bundles, i.e., the ratio of the area of the fiber cores to the area of the entire bundle endface. For example, only 32% of the light uniformly illuminating the end of a bundle falls on fiber core areas, assuming the fibers are stacked in a close packed array and are of the aforementioned type wherein the overall diameter is 5 mils and the cladding thickness is 1 mil. If the end of such a bundle is illuminated by light from another bundle, the amount of light coupled to the receiving bundle is even less, since the packing fraction of both bundles must be taken into consideration where the two bundles are joined at a random orientation. If no attempt is made to reduce packing fraction losses, it has been found that as little as 15% of the light propagating in one bundle may be transmitted to the other. Thus, for a random butt joint between two fiber bundles of the heretofore described 5 mil optical waveguide fibers, there can be an 8 dB insertion loss. Losses of this magnitude cannot be tolerated in optical communication systems, especially in view of the fact that waveguide attenuation is only about 4 dB/km. To provide connectors having low insertion losses, packing fraction losses must be substantially reduced. Due to the small size of optical waveguide fibers and the number of fibers that are disposed in a single bundle, any attempt at connecting each individual fiber in one bundle to a corresponding fiber in the other bundle would be impractical, and yet the random joining of two bundles gives rise to intolerable insertion loss.

SUMMARY OF THE INVENTION

It is therefore an object of the present invention to provide a low loss in-line connector for use between two optical waveguide bundles.

Another object is to provide an arrangement for grouping the optical waveguide fibers of two bundles in such a manner that good registration can be obtained between corresponding fibers when the two bundles are joined end-to-end.

Briefly, the present invention relates to an in-line connector for joining first and second bundles of optical waveguide fibers. The connector comprises first fiber supporting means having at least one fiber supporting surface. The end portions of the fibers of the first bundle are disposed in at least one line array on the fiber supporting surface of the first fiber supporting means in such a manner that each fiber in the array is in contact with the fibers adjacent thereto, and the endfaces of the first bundle of fibers lie in a plane that is substantially perpendicular to the axes of the first bundle end portions. First array positioning means is disposed at one end of the fiber supporting surface of the first supporting means and is in contact with an end fiber in the first array. The connector further comprises second fiber supporting means having at least one fiber supporting surface. The end portions of the fibers of the second bundle are disposed in at least one line array on the fiber supporting surface of the second fiber supporting means in such a manner that each fiber in the array is in contact with the fibers adjacent thereto, and the endfaces of the second bundle of fibers lie in a plane that is substantially perpendicular to the axes of the second bundle end portions. The cross-sectional shape of the fiber supporting surface of the second fiber supporting means is a mirror image of that of the first fiber supporting means. Second array positioning means is disposed at one end of the fiber supporting surface of the second fiber supporting means and is in contact with an end fiber in the second array. Means are provided for aligning the first and second fiber supporting means so that the first and second array positioning means are aligned and so that the fiber supporting surfaces of the first and second fiber supporting means are aligned, the fibers of the first line array thereby being substantially aligned with corresponding fibers of the second line array.

DESCRIPTION OF THE PREFERRED EMBODIMENTS

The present invention relates to a coupler for aligning a plurality of optical waveguide fibers in a first bundle or cable with corresponding fibers in a second bundle so that a one-to-one fiber alignment is substantially achieved. Such alignment can be obtained by assembling the end portions of the fibers of each bundle into one or more line or ribbon arrays. As used herein, the phrase "line array" means a plurality of optical waveguides disposed in a parallel, side-by-side manner such that any waveguide within the array is in contact with a maximum of two adjacent waveguides. For optimum coupling of light, the axes of the end portions of all fibers in a bundle must be substantially parallel, and the endfaces of the fibers of a line array should be disposed in a single plane, the centers of such endfaces lying on a single line or curve.

Figure 1:
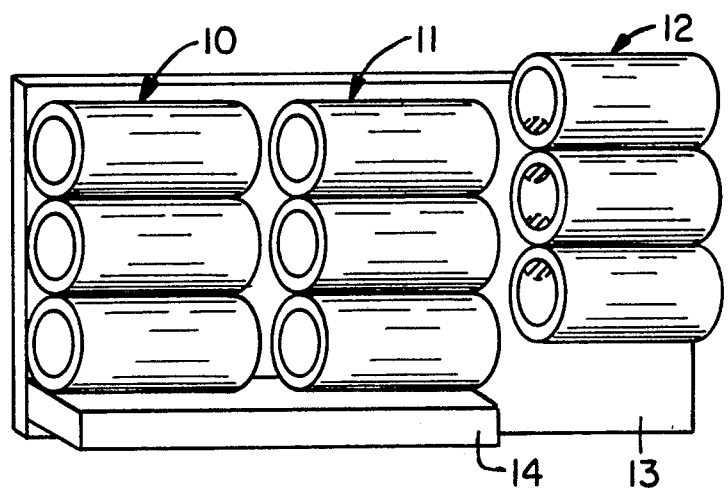
FIG. 1 is an oblique view illustrating basic principles of the present invention.

Whenever a plurality of optical waveguide fibers of the type disclosed in the aforementioned Maurer et al. patent is assembled into a bundle, the optical energy propagating through the fibers emerges from the bundle endface in the areas defined by the fiber cores, since most of the optical energy propagates within the cores. Similarly, whenever optical energy illuminates the endface of a bundle, the areas presented by the fiber cores accept the optical energy. Therefore, whenever two fiber bundles are butted end-to-end, optical energy is coupled between the bundles only in those regions where fiber cores overlap. Referring to FIG. 1, three line arrays 10, 11 and 12 of similar optical waveguide fibers are disposed on fiber supporting surface 13. Extremely short fibers are illustrated, the purpose of this figure being to illustrate the basic alignment principle of the present invention and to illustrate the detrimental effect of fiber misalignment. The end fibers in arrays 10 and 11 are disposed in contact with array positioning member 14, thereby causing these two end fibers to be coaxial. Since the diameters of the fibers in arrays 10, 11 and 12 are substantially the same and since the end fibers in arrays 10 and 11 are aligned, each of the fibers in array 10 will be substantially aligned with a corresponding fiber in array 11, and maximum optical coupling between the two arrays will occur. In this figure the ends of the fibers in array 11 are illustrated as being separated from the ends of the fibers in arrays 10 and 12 solely for the purpose of illustrating degree of fiber core overlap, it being understood that coupling of light between two adjacent fibers is maximized when the endfaces thereof are in contact.

The poorest coupling occurs when the fibers of two arrays are displaced by one half the fiber diameter. Such an orientation exists between the fibers of arrays 11 and 12, the amount of overlap of the cores of fibers in array 11 with those of array 12 being indicated by shaded areas on the core endfaces of array 12. It is noted that the amount of core-to-core overlap for misaligned fibers is reduced by a factor which depends on the core to cladding thickness ratio.

Figure 2:
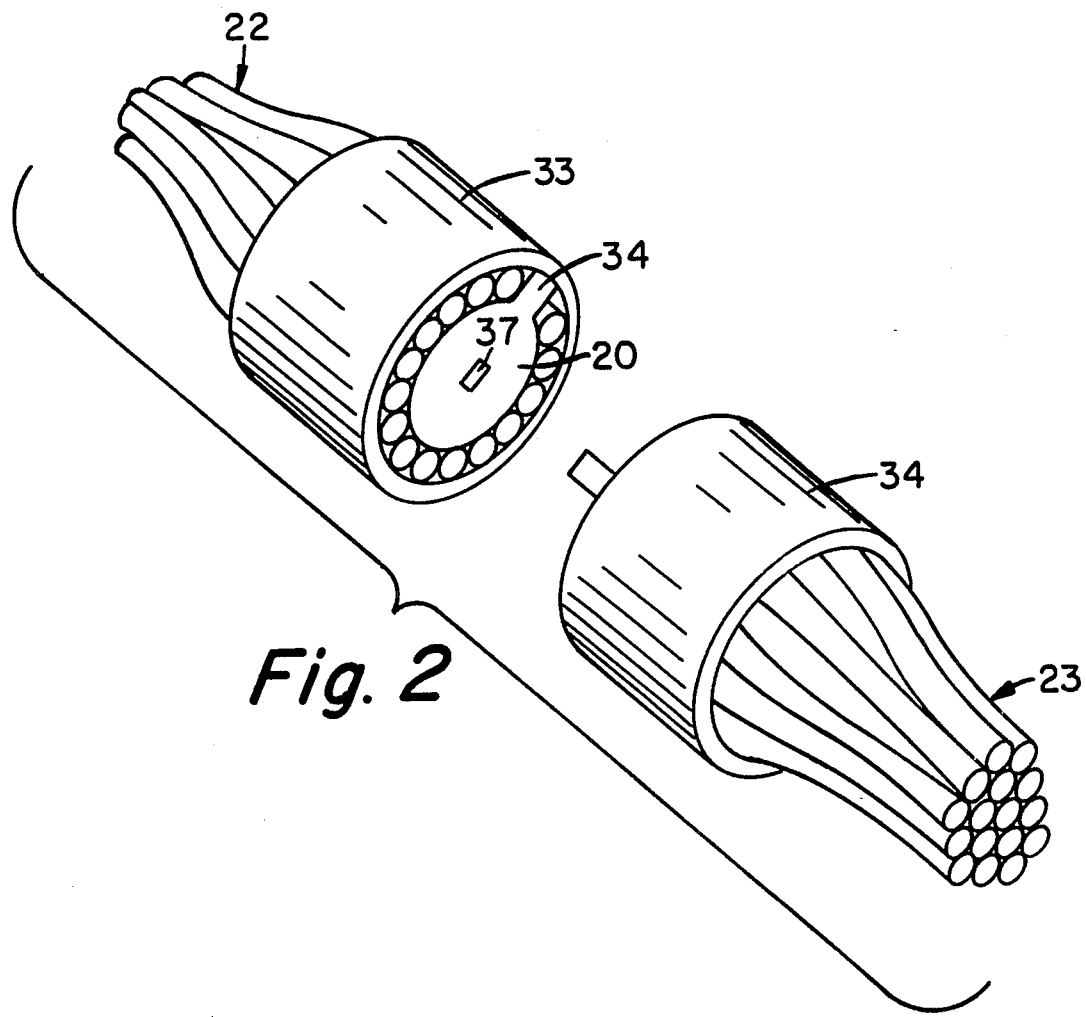
FIG. 2 is an exploded oblique view of a connector constructed in accordance with the present invention.

Due to connector size considerations, it may be undesirable to form into a single planar array a bundle containing a large number of fibers. To form more compact connectors, the fibers in the two bundles to be connected can be disposed upon curved fiber supporting surfaces such as cylindrical mandrels 20 and 21 of FIGS. 2 and 3. To join the ends of the fibers of bundle 22 with the ends of the fibers of bundle 23 so that a one-to-one fiber alignment is substantially achieved, the fibers of bundle 22 are disposed around the circumference of mandrel 20 in such a manner that each fiber is caused to contact the fibers adjacent thereto and the end fiber in this circular array is caused to contact an array positioning member 24 which extends from the cylindrical surface of mandrel 20. The fibers of bundle 23 are similarly disposed around the surface of mandrel 21, but the end fiber in the circular array so formed is caused to contact the opposite side of array positioning member 25. As illustrated in FIG. 2, the opposite end of the circular array of fibers does not contact the other end of member 24. This gap provides the necessary space in the event that many of the fibers have larger than average diameters. The fibers of the circular arrays which are disposed upon mandrels 20 and 21 may be affixed to those mandrels by a suitable bonding material such as epoxy, or the fibers may be retained on the mandrel by clamping means known in the connector art. A sleeve 33, which may consist of shrinkable tubing may be disposed around those fibers which are supported by mandrel 20 and a similar sleeve 34 may be disposed around those fibers which are supported by mandrel 21. The mandrel endfaces and the corresponding ends of the fibers supported thereby are suitably ground and finished. It is therefore preferred that the mandrels be made of glass, brass or some other material having grinding characteristics similar to those of the optical waveguide material. The endfaces of the waveguides thus lie in the planes of the mandrel endfaces which are preferably perpendicular to the axes of the waveguide end portions. The exposed endfaces of the two mandrels are then brought together in such a manner that array positioning members 24 and 25 are substantially aligned. An alignment key 35, which extends into alignment apertures 37 and 38 of mandrels 20 and 21, maintains members 24 and 25 in alignment. After the endfaces of mandrels 20 and 21 are brought together, they are secured by clamping means 39.

Figure 4:
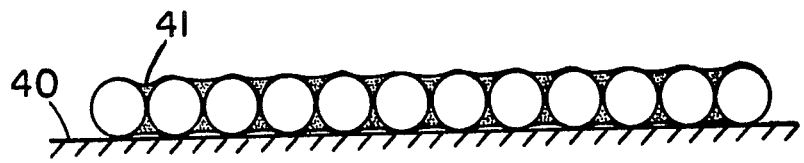
FIG. 4 is an end view illustrating the initial preparation of an array of fibers.

A convenient method for facilitating the disposition of the fibers of a bundle onto a support surface of circular or other configuration is to first form a flexible line array as shown in FIG. 4. The end portions of the fibers of a bundle are spread out over a planar or other suitable surface 40 in such a manner that each fiber is in contact with the fibers adjacent thereto, and a flexible bonding material 41 such as rubber cement is applied to the fibers. After the bonding material has cured, the array can be easily disposed upon a support surface.

Figure 3:
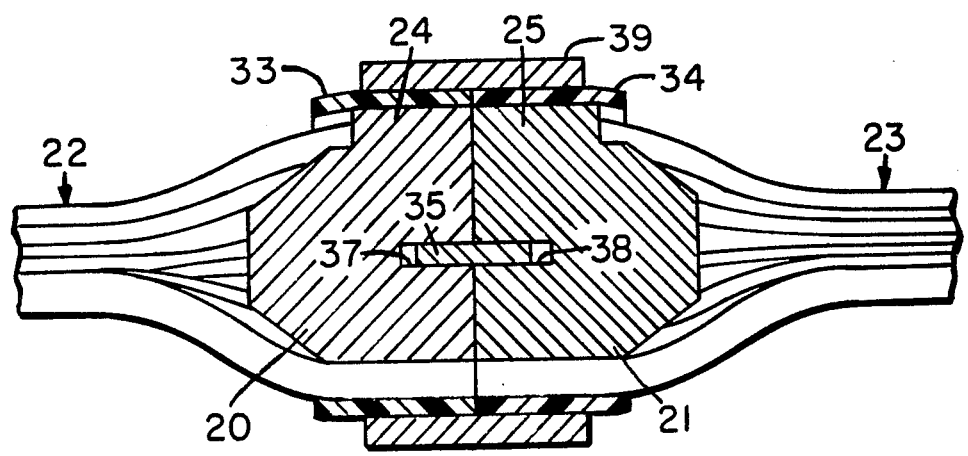
FIG. 3 is a cross-sectional view of the connector of FIG. 2.
Figure 5:
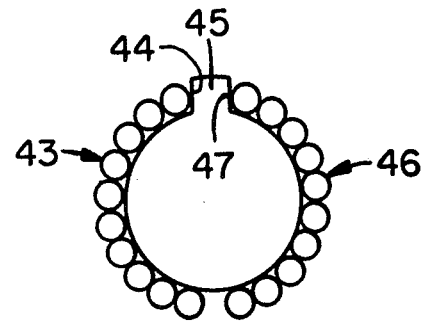
FIG. 5 illustrates a modification of the embodiment illustrated in FIGS. 2 and 3.

In practice, the diameters of the fibers in an array will not be identical, but will vary by some small amount about some average diameter. If two arrays of such fibers are butted together such that the first fiber in one array completely overlaps the first fiber in the other array, then the second fibers in the arrays should experience a nearly complete overlap, and the degree of overlap will statistically decrease as further fibers are considered. For a given diameter size distribution, there will exist a corresponding number of fibers in a ribbon such that the coupling efficiency will statistically remain above some specified value. It may, therefore, be advantageous to divide the fiber bundle into several arrays in order to achieve a specified coupling efficiency. If a circular mandrel of the type illustrated in FIGS. 2 and 3 is employed, two or more arrays of fibers can be disposed around the circumference of the mandrel in the manner illustrated in FIG. 5. In this embodiment an end fiber of array 43 is disposed in contact with surface 44 of array positioning member 45, and an end fiber of array 46 is in contact with surface 47 thereof. Additional arrays could be disposed on the mandrel if two or more alignment members were employed.

Figure 6:
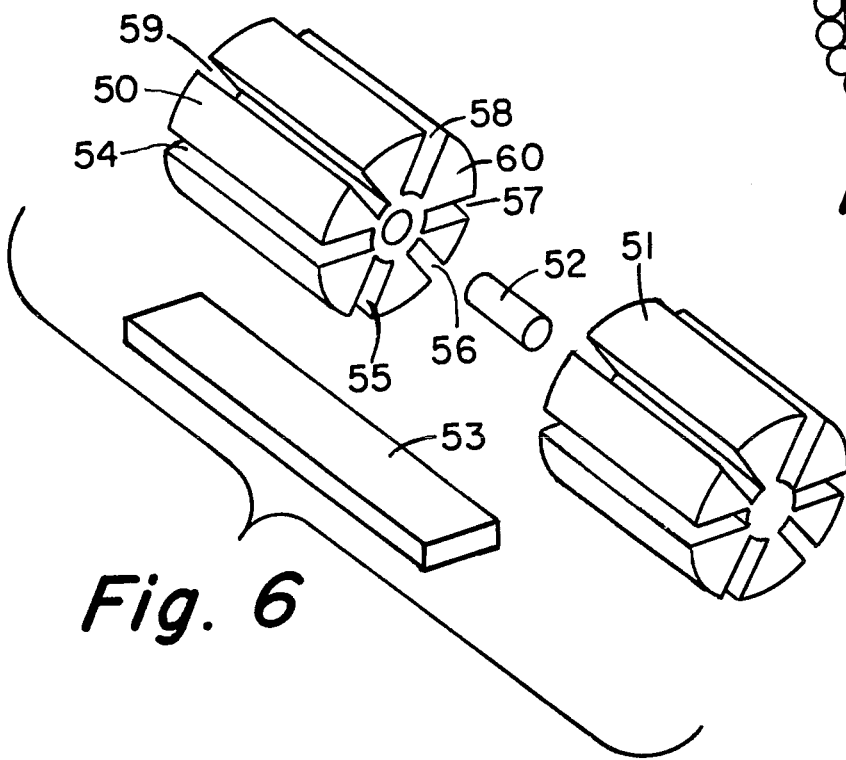
FIG. 6 is an exploded oblique view of a further embodiment of the present invention.

Connectors of this type illustrated in FIG. 6 can be employed to increase the number of fiber arrays, thereby decreasing the number of fibers per array and increasing the overall coupling efficiency. In this embodiment, the fibers of a bundle are formed into a plurality of linear arrays which are adapted to be disposed in radial slots in a connector. For the sake of simplicity, the fibers are not illustrated in this embodiment. Cylindrical support members 50 and 51 are maintained in axial alignment by a cylindrical pin 52 and the slots therein are aligned by disposing alignment strip 53 into corresponding slots in each member. Thus, for example, alignment strip 53 is disposed in slot 54 of member 50, and five linear arrays of optical waveguides are disposed in slots 55 through 59 in such a manner that the endfaces of all fibers are disposed in the plane of endface 60. Since the fibers of the second bundle are similarly divided into linear arrays which are disposed in the slots of member 51, high coupling efficiency is achieved by joining the two fiber support members in precise alignment in the manner heretofore described. In this embodiment the bottom of a slot functions as the array positioning means and each slot has two fiber supporting surfaces, i.e., the walls thereof.

Although specific reference has been made herein to conventional optical waveguides having a transparent core surrounded by a layer of transparent cladding material having a refractive index lower than that of the core, it is to be understood that the present invention is not limited to any particular type of optical waveguide. The connector of the present invention is useful for coupling bundles of any type of optical waveguide including multiclad fibers and fibers having either a continuous or a step gradient refractive index. Moreover, optical waveguide connectors constructed in accordance with the present invention may employ line arrays of configuration other than the linear and circular configurations described herein.

We claim:

1. An in-line connector for joining first and second bundles of optical waveguide fibers, said connector comprising:

first fiber supporting means having at least one fiber supporting surface, the end portions of the fibers of said first bundle being disposed in at least one line array on said fiber supporting surface of said first fiber supporting means, each fiber in said array being in contact with the fibers adjacent thereto, the endfaces of said first bundle of fibers lying in a plane that is substantially perpendicular to the axes of said first bundle end portions, first array positioning means disposed at only one end of said fiber supporting surface of said first supporting means and in contact with an end fiber in said first array, the opposite end fiber in said first array remaining free from any array positioning means, second fiber supporting means having at least one fiber supporting surface, the end portions of the fibers of said second bundle being disposed in at least one line array on said fiber supporting surface of said second fiber supporting means, each fiber in said array being in contact with the fibers adjacent thereto, the endfaces of said second bundle of fibers lying in a plane that is substantially perpendicular to the axes of said second bundle end portions, the cross-sectional shape of said at least one fiber supporting surface of said second fiber supporting means being a mirror image of that of said first fiber supporting means, second array positioning means disposed at only one end of said fiber supporting surface of said second supporting means and in contact with an end fiber in said second array, the opposite end fiber in said second array remaining free from any array positioning means, means for aligning said first and second fiber supporting means so that said first and second array positioning means are aligned and said at least one fiber supporting surface of said first and second fiber supporting means are aligned, whereby the fibers of said first line array are substantially aligned with corresponding fibers of said second line array, and means for securing together said first and second fiber supporting means.

2. A connctor in accordance with claim 1 wherein said first and second bundles are each divided into a plurality of line arrays.

3. A connector in accordance with claim 1 wherein said fiber support surfaces of said first and second fiber supporting means are curved.

4. A connector in accordance with claim 1 wherein said fiber supporting surfaces of said first and second fiber supporting means are planar.

5. A connector in accordance with claim 1 wherein the fibers of said first and second arrays are secured together by flexible binding material disposed between said fibers.

6. A connector in accordance with claim 1 wherein said first and second fiber supporting means are cylindrical mandrels, said first and second arrays being disposed around the circumference of said first and second mandrels, respectively.

7. A connector in accordance with claim 1 wherein said first and second fiber support means are first and second cylinders, respectively, each of said cylinders having means defining a plurality of radially disposed slots said first bundle being divided into a plurality of line arrays, each of which is disposed in a respective slot in said first cylinder, said second bundle being divided into a plurality of line arrays, each of which is disposed in a respective slot of said second cylinder, an end fiber in each of said line arrays being in contact with the bottom of the slot in which it is disposed.

8. A connector in accordance with claim 7 wherein said means for aligning comprises an alignment strip disposed in one of the slots in each of said slotted cylinders.

9. A connector in accordance with claim 1 wherein said first and second fiber supporting means have a planar endfaces which are substantially perpendicular to the fiber end portions that are disposed thereon, said fiber end portions terminating in the plane of the endface of the fiber supporting means upon which they are disposed.

10. A connector in accordance with claim 6 further comprising means for bonding the fibers of said first and second arrays to said cylindrical mandrels.

11. A connector in accordance with claim 10 wherein the space between corresponding fibers of said first and second arrays is free from bonding material.

12. A connector in accordance with claim 7 wherein the space between fibers of said first and second arrays is free from bonding material.

* * * * *